(12) United States Patent
Liu

(10) Patent No.: US 10,518,653 B2
(45) Date of Patent: Dec. 31, 2019

(54) MOTOR-GENERATOR SYSTEM

(71) Applicant: GATES CORPORATION, Denver, CO (US)

(72) Inventor: Keming Liu, Sterling Heights, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 16/275,508

(22) Filed: Feb. 14, 2019

(65) Prior Publication Data

US 2019/0176647 A1   Jun. 13, 2019

Related U.S. Application Data

(62) Division of application No. 15/451,052, filed on Mar. 6, 2017, now Pat. No. 10,245,971.

(51) Int. Cl.
| | |
|---|---|
| *B60L 15/20* | (2006.01) |
| *H02P 29/40* | (2016.01) |
| *B60L 15/00* | (2006.01) |
| *F02D 41/06* | (2006.01) |
| *F02N 11/04* | (2006.01) |
| *F02N 15/08* | (2006.01) |
| *F02B 67/06* | (2006.01) |

(Continued)

(52) U.S. Cl.
CPC .............. *B60L 15/20* (2013.01); *B60L 15/007* (2013.01); *B60L 50/16* (2019.02); *F02B 67/06* (2013.01); *F02D 31/001* (2013.01); *F02D 41/062* (2013.01); *F02N 11/04* (2013.01); *F02N 15/08* (2013.01); *H02P 29/40* (2016.02); *F02D 2200/101* (2013.01); *F02D 2250/24* (2013.01); *Y02T 10/7258* (2013.01)

(58) Field of Classification Search
CPC ........ B60L 15/20; B60L 50/16; B60L 15/007; F02B 67/06; F02N 11/04; F02N 15/08; H02P 29/40; Y02T 10/7258; F02D 2200/101; F02D 2250/24; F02D 31/001; F02D 41/062
See application file for complete search history.

(56) References Cited

U.S. PATENT DOCUMENTS

| | | | | |
|---|---|---|---|---|
| 6,209,672 B1 * | 4/2001 | Severinsky | ............ | B60K 6/442 |
| | | | | 180/65.23 |
| 6,278,195 B1 * | 8/2001 | Yamaguchi | ............. | B60L 50/16 |
| | | | | 290/40 A |

(Continued)

*Primary Examiner* — Jacob B Meyer
(74) *Attorney, Agent, or Firm* — Paul N. Dunlap, Esq.

(57) ABSTRACT

A motor-generator system comprising an internal combustion engine, a motor-generator in driven engagement with the internal combustion engine by an endless belt, the motor-generator, a controller detecting a speed signal of the internal combustion engine, a driver input signal, a battery state signal and a motor-generator signal, the motor-generator operable to provide a motoring torque or a load torque to the internal combustion engine at a predetermined frequency according to a controller command, and the controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration.

6 Claims, 6 Drawing Sheets

(51) Int. Cl.
*F02D 31/00* (2006.01)
*B60L 50/16* (2019.01)

(56) References Cited

U.S. PATENT DOCUMENTS

| | | | | |
|---|---|---|---|---|
| 6,286,473 B1* | 9/2001 | Zaremba | F02B 75/06 | 123/192.1 |
| 6,336,070 B1* | 1/2002 | Lorenz | B60K 6/48 | 701/102 |
| 6,441,506 B2* | 8/2002 | Nakashima | B60K 6/365 | 123/179.1 |
| 6,655,339 B1* | 12/2003 | Orr | B60H 1/00421 | 123/192.1 |
| 6,832,148 B1* | 12/2004 | Bennett | B60K 6/445 | 701/54 |
| 6,840,341 B2* | 1/2005 | Fujikawa | B60W 10/04 | 180/65.25 |
| 7,110,867 B2* | 9/2006 | Imazu | B60W 30/20 | 701/22 |
| 7,217,221 B2* | 5/2007 | Sah | B60K 6/445 | 477/3 |
| 7,559,384 B2* | 7/2009 | Palladino | F02B 67/06 | 180/53.8 |
| 7,633,257 B2* | 12/2009 | Sakamoto | B60W 30/20 | 318/611 |
| 7,680,567 B2* | 3/2010 | Syed | B60K 6/445 | 701/22 |
| 7,723,938 B2* | 5/2010 | Tsuji | B60K 1/02 | 318/432 |
| 7,997,363 B2* | 8/2011 | Mori | B60K 6/28 | 180/65.265 |
| 8,010,263 B2* | 8/2011 | Morris | B60K 6/445 | 701/51 |
| 8,092,339 B2* | 1/2012 | Heap | B60K 6/445 | 477/5 |
| 8,140,230 B2* | 3/2012 | Haggerty | B60K 6/445 | 701/54 |
| 8,195,352 B2* | 6/2012 | Morris | B60W 10/11 | 701/22 |
| 8,311,721 B2* | 11/2012 | Whitney | F02D 37/02 | 123/406.23 |
| 8,374,771 B2* | 2/2013 | Falkenstein | B60K 6/48 | 701/105 |
| 8,390,240 B2* | 3/2013 | Stancu | B60L 15/025 | 318/727 |
| 8,452,469 B2* | 5/2013 | Otokawa | B60K 6/365 | 701/22 |
| 8,801,567 B2* | 8/2014 | Demirovic | B60K 6/387 | 477/5 |
| 8,827,865 B2* | 9/2014 | Naqvi | B60W 20/00 | 477/5 |
| 8,849,460 B2* | 9/2014 | Ye | B60W 10/08 | 700/275 |
| 8,874,297 B2* | 10/2014 | Bang | B60L 15/2045 | 701/22 |
| 8,961,364 B2* | 2/2015 | Nefcy | F16D 48/02 | 477/175 |
| 9,020,676 B2* | 4/2015 | Kim | B60W 10/06 | 701/22 |
| 9,303,571 B2* | 4/2016 | Yu | F02D 28/00 | |
| 9,327,707 B2* | 5/2016 | Hawkins | B60W 10/06 | |
| 9,441,680 B2* | 9/2016 | Boyes | F02B 67/06 | |
| 9,515,597 B2* | 12/2016 | O'Donnell | F16H 37/065 | |
| 9,517,704 B2* | 12/2016 | Hashimoto | B60L 3/0061 | |
| 9,533,601 B2* | 1/2017 | Hashimoto | B60L 15/20 | |
| 9,925,891 B2* | 3/2018 | Ko | B60L 15/20 | |
| 10,035,504 B2* | 7/2018 | Hashimoto | B60L 50/51 | |
| 10,071,725 B2* | 9/2018 | Kanou | B60W 20/15 | |
| 2002/0039942 A1* | 4/2002 | Liu | F02B 63/04 | 474/133 |
| 2002/0039944 A1* | 4/2002 | Ali | F16H 7/1209 | 474/135 |
| 2003/0029653 A1* | 2/2003 | Fujikawa | B60K 6/365 | 180/65.25 |
| 2004/0142790 A1* | 7/2004 | Tomura | B60K 6/445 | 477/2 |
| 2005/0247503 A1* | 11/2005 | Imazu | B60L 50/16 | 180/300 |
| 2005/0253543 A1* | 11/2005 | Soudier | H02P 21/05 | 318/432 |
| 2005/0255968 A1* | 11/2005 | Sah | B60K 6/445 | 477/200 |
| 2006/0030979 A1* | 2/2006 | Kuang | B60K 6/445 | 701/22 |
| 2007/0249461 A1* | 10/2007 | Tsuji | B60K 1/02 | 477/3 |
| 2012/0081051 A1* | 4/2012 | Kobayashi | B60K 6/48 | 318/400.23 |
| 2012/0083953 A1* | 4/2012 | Izawa | B60L 50/16 | 701/22 |
| 2014/0107877 A1* | 4/2014 | Bang | B60L 15/2045 | 701/22 |
| 2014/0291104 A1* | 10/2014 | Boyes | F02B 67/06 | 192/75 |
| 2015/0318812 A1* | 11/2015 | O'Donnell | F16H 37/065 | 318/498 |
| 2016/0052422 A1* | 2/2016 | Hashimoto | B60L 15/20 | 701/22 |
| 2016/0065107 A1* | 3/2016 | Klein | F01B 27/02 | 290/31 |
| 2017/0043677 A1* | 2/2017 | Ko | B60L 15/20 | |
| 2017/0267229 A1* | 9/2017 | Hashimoto | B60K 6/485 | |
| 2018/0202379 A1* | 7/2018 | Nagashima | F02D 41/3058 | |
| 2018/0230919 A1* | 8/2018 | Nagashima | F02D 41/3058 | |
| 2018/0251041 A1* | 9/2018 | Liu | F02D 41/062 | |

* cited by examiner

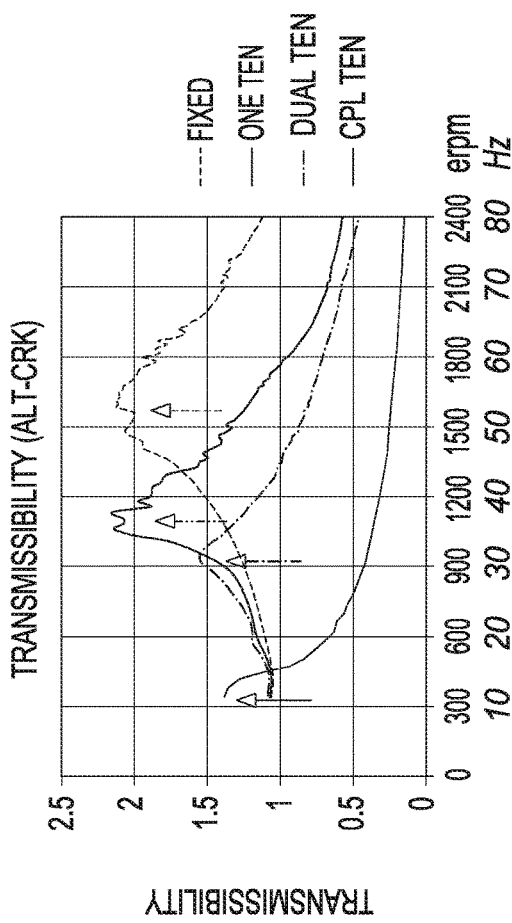
FIG.4a
| | 1ST FREQUENCY [Hz] |
|---|---|
| FIXED | 53 |
| ONE TEN | 37 |
| DUAL TEN | 31 |
| CPL TEN | 11 |
FIG.4b
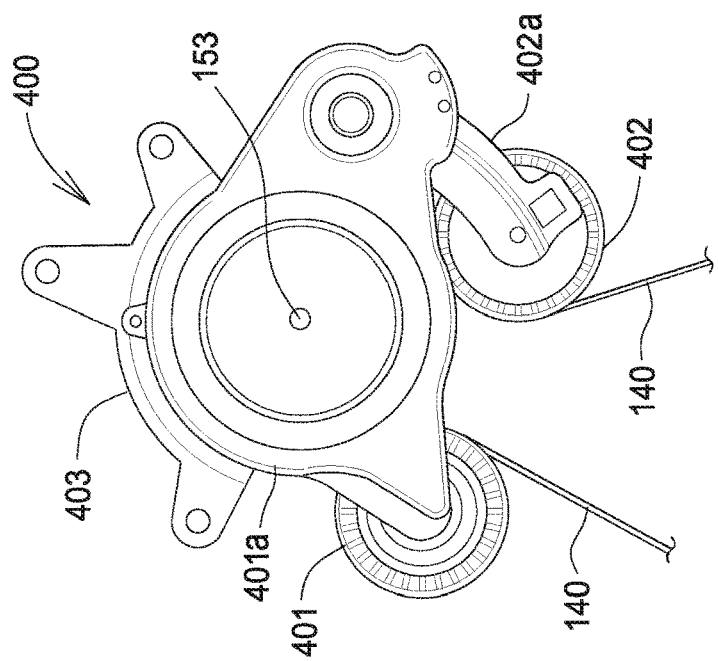
FIG.3

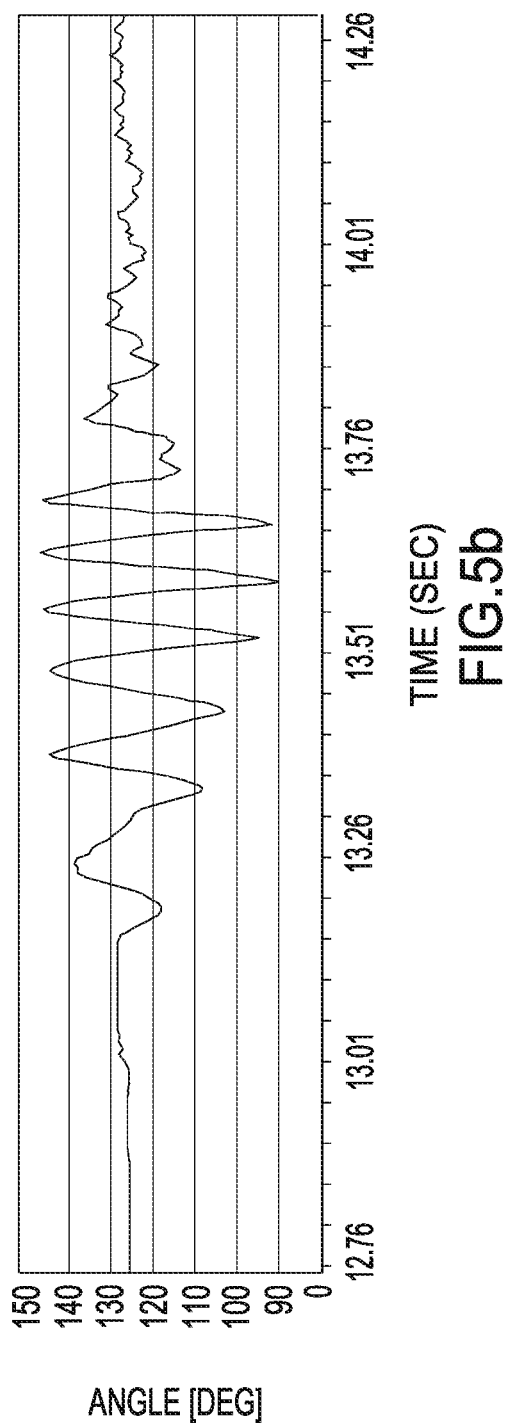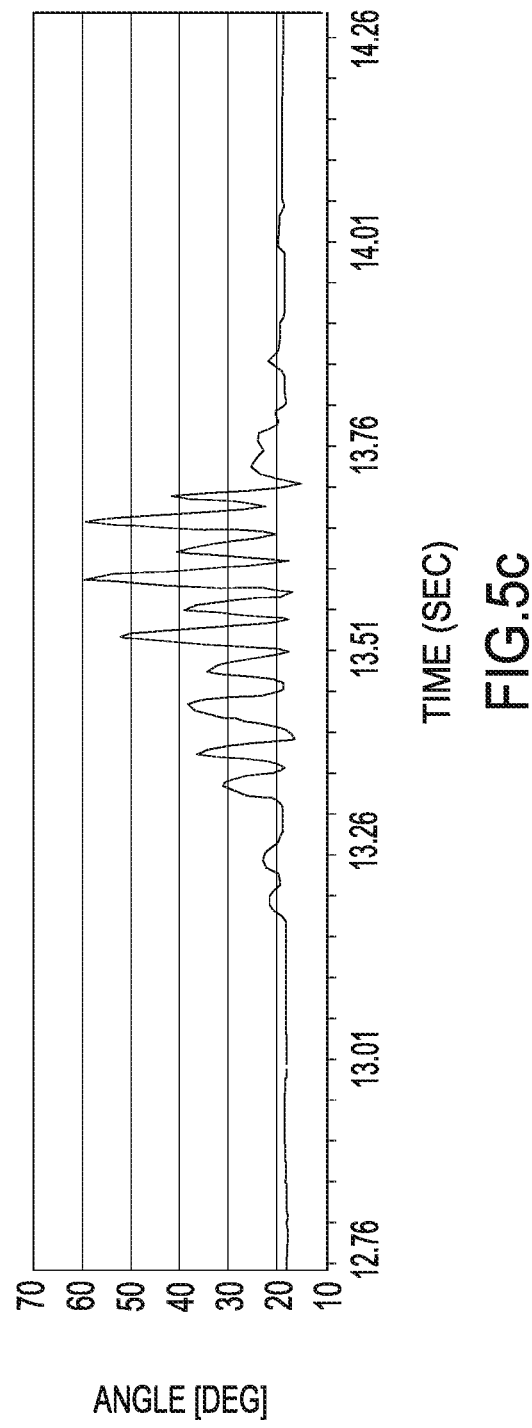

MOTOR-GENERATOR SYSTEM

REFERENCE TO RELATED APPLICATIONS

This application is a divisional of and claims priority from U.S. patent application Ser. No. 15/451,052 filed Mar. 6, 2017.

FIELD OF THE INVENTION

The invention relates to a motor-generator system, and more particularly, to a controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration.

BACKGROUND OF THE INVENTION

Internal combustion engines combust an air/fuel mixture to drive pistons that rotatably turn a crankshaft to generate drive torque. The drive torque is transferred from the crankshaft to a drivetrain to propel a vehicle. Mild hybrid vehicles can be temporarily powered using electric motors, which can allow the engines to be periodically turned off to decrease fuel consumption. One example of a mild hybrid vehicle is a vehicle having an engine and a belt-driven starter generator (BSG). The crankshaft of the engine is coupled to a crankshaft pulley and the BSG is coupled to the crankshaft pulley via a belt. When the engine needs to be restarted after a period of inactivity, the BSG can turn the crankshaft using the belt to restart the engine quickly and smoothly.

A multi-ribbed belt is commonly used on automotive vehicles to transmit power between the engine and accessory components. On a conventional drive, the engine crankshaft pulley drives accessories via one belt or multi belts. A tensioner is usually used when multiple accessories are driven via a belt.

In recent years, motor-generator units (MGU) were implemented to do BSG engine start-stop to provide torque assist to boost engine acceleration and to do recuperation to generate electricity in addition to normal generation usually carried out by an alternator. Significant fuel saving and reduction of exhaust can be achieved by a BSG.

To control tension in two different modes of motoring (MGU driving) and generating (engine driving), a group of tensioner designs are frequently used for BSG drives. The common feature of the design is that the tensioner has two arms which are connected by one spring. These tensioners can control belt tension in both modes: motoring and generating. Since motion of both arms is coupled via one spring, the system $1^{st}$ frequency is significantly reduced, usually shifted below engine firing frequency at idle speed, and vibration of belt drive is significantly reduced in normal operation rpm range.

However, during engine key start, a belt drive using this type of tensioner exhibits high system vibration when the engine speed firing frequency passes through the reduced system frequency, generating system resonance associated NVH issues. To attenuate system vibration of a belt drive which uses an MGU, special control of MGU torque is needed control MGU motion.

A BSG drive can stand alone to become a mild-hybrid system or work together with an integrated start-generator system (ISG) as a hybrid system. The MGU in a BSG drive generates drive torque, consuming power from a battery, to start the engine or to boost in engine acceleration when the driver accelerates to speed up the vehicle. It also functions as an alternator or generator, applying load torque for generating electricity power to charge the battery: recuperation or normal generation. Recuperation generates high torque load and high electric power typically seen in braking operation and moderate load when the foot of driver is off the pedal.

In driving or generating mode, the torque magnitude from MGU is controlled by a number of factors. For example, higher drive torque in boost operation when the driver accelerates very hard; or higher load torque in recuperation when the driver requires hard braking. There is one common feature: direction of torque from MGU, driving or loading, does not change until the operation demand of the engine is changed by the driver.

The rotary speed of an internal combustion engine fluctuates around its average speed. The fluctuation of engine speed is called angular vibration (AV). For example, a 4-cyl engine runs at 750 rpm average speed may have 60 rpm AV at 25 Hz firing frequency. For normal control of a BSG drive, engine average speed is the primary factor. Engine/vehicle acceleration/deceleration refers to average speed.

The prior art BSG systems are used for torque boost wherein the BSG provides start up torque or additional drive torque to supplement the IC engine torque output.

Representative of the art is U.S. Pat. No. 9,303,571 which discloses a method to determine a desired torque output from an engine system in response to a torque request, the engine system including an engine and a belt-driven starter generator (BSG). The method can include determining a current engine torque capacity. When the desired torque output is greater than the current engine torque capacity, the method can include (i) determining a maximum engine torque capacity, (ii) determining a current BSG torque capacity, (iii) commanding the BSG to operate as a torque generator or a torque consumer based on a difference between the desired torque output and the maximum engine torque capacity and a state of a battery system configured to power the BSG, and (iv) controlling the engine and the BSG to collectively generate the desired torque output at a flywheel of the engine.

What is needed is a controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration. The present invention meets this need.

SUMMARY OF THE INVENTION

The primary aspect of the invention is to provide a controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration.

Other aspects of the invention will be pointed out or made obvious by the following description of the invention and the accompanying drawings.

The invention comprises a motor-generator system comprising an internal combustion engine, a motor-generator in driven engagement with the internal combustion engine by an endless belt, the motor-generator, a controller detecting a speed signal of the internal combustion engine, a driver input signal, a battery state signal and a motor-generator signal, the motor-generator operable to provide a motoring torque or a load torque to the internal combustion engine at a predetermined frequency according to a controller command, and the controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a coupled tensioner.
FIG. 4a is a system vibration chart.
FIG. 4b is a system frequency chart.
FIG. 5b is a chart showing tensioner base arm motion during engine start.
FIG. 5c is a chart showing tensioner side arm motion during engine start.

DETAILED DESCRIPTION OF THE PREFERRED EMBODIMENT

Figure 1:
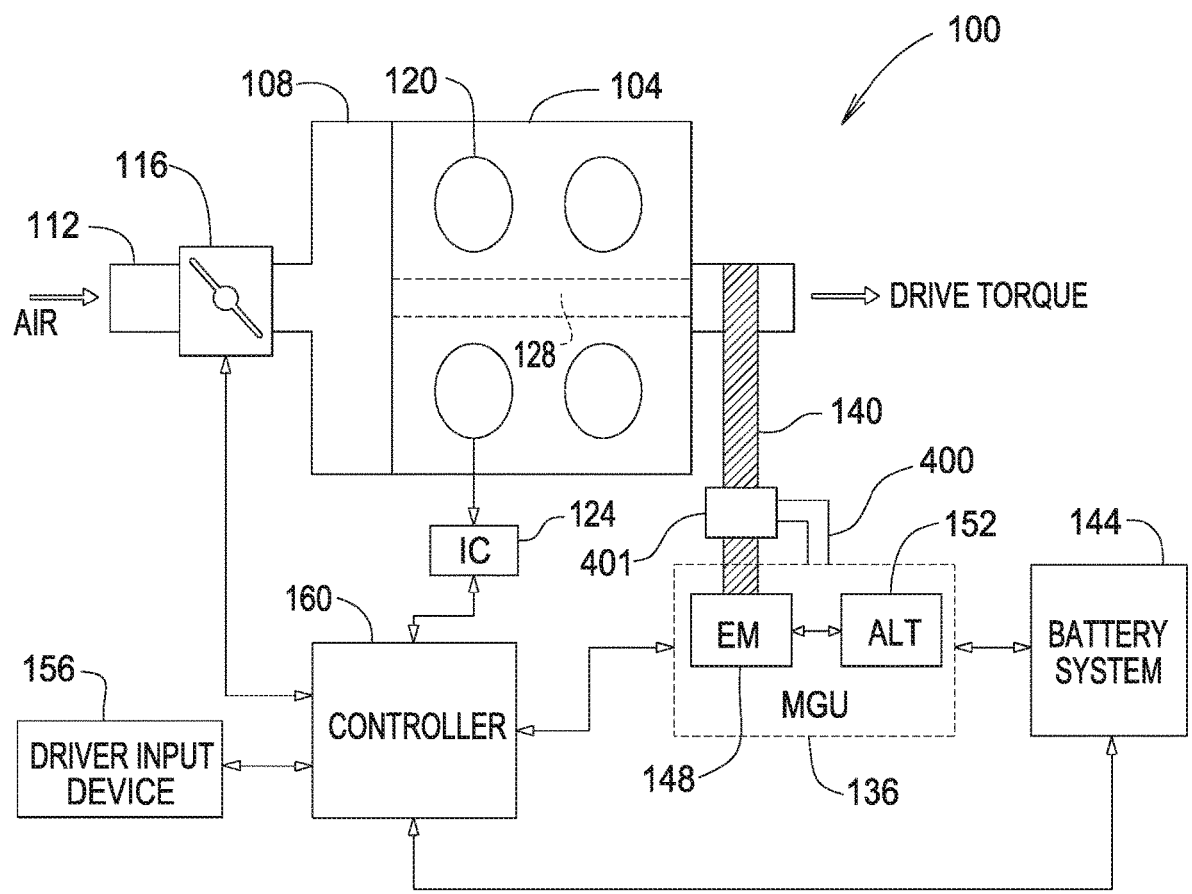
FIG. 1 is a BSG system schematic.

Referring now to FIG. 1, an example diagram of an engine system 100 is illustrated. Engine system 100 comprises an internal combustion engine 104 (hereinafter "engine 104"). The engine 104 can be any suitable engine configured to combust an air/fuel mixture to generate drive torque (a spark ignition engine, a diesel engine, a homogeneous charge compression ignition engine, etc.). The fuel may be gasoline, diesel, or another suitable combustible fuel (ethanol, natural gas, propane, hydrogen, etc.). The engine system 100 can be implemented in a vehicle, and the drive torque generated by the engine 104 is used to propel the vehicle using a transmission and suitable drivetrain components.

Engine 104 draws air into an intake manifold 108 through an induction system 112 regulated by a throttle 116. Air in the intake manifold 108 is distributed to a plurality of cylinders 120 and combined with fuel, e.g., gasoline, from fuel injectors (not shown) to create an air/fuel mixture. Engine 104 may include any number of cylinders. The air/fuel mixture is compressed and combusted within the cylinders 120 to drive pistons (not shown) that rotatably turn a crankshaft 128 to generate drive torque. An ignition controller (IC) 124 controls timing of combustion of the air/fuel mixture, e.g., spark plug timing. Drive torque is transferred to vehicle drivetrain components from crankshaft 128.

Engine system 100 includes a motor-generator unit (MGU) 136. The MGU 136 is coupled to crankshaft 128 via a belt 140 through a shaft 153. Shaft 153 comprises a pulley (not shown) engaged with belt 140. The drive torque is partially transferred to the MGU 136 via the belt 140, wherein the MGU 136 operates as a "torque consumer". Similarly, in another operating mode MGU 136 drives the crankshaft 128 via the belt 140, e.g., during engine restarts or boost. In this mode the MGU is a "torque generator". MGU 136 can be powered by a battery system 144. Battery system 144 can comprise a single battery, e.g., a typical 12 volt lead-acid car battery, or a battery pack comprising a plurality of batteries, e.g., a 48 volt lithium-ion battery pack. Tensioner 400 engages belt 140 through pulley 401 and 402, see FIG. 3. Tensioner 400 imparts a belt load to belt 140 to maintain a proper tension in belt 140 whereby power is transmitted from the crankshaft 128 to the various driven accessories.

MGU 136 comprises an electric motor (EM) 148 and an alternator (ALT) 152. When MGU 136 is driving crankshaft 128, electric motor 148 is powered by the battery system 144. The capability of MGU 136 to operate as a torque generator, therefore, depends on the state of the battery system 144. For example, the MGU 136 may be prohibited from operating as a torque generator when a state-of-charge (SOC) of the battery system 144 is below a predetermined threshold. Alternatively, when being driven by crankshaft 128, MGU 136 generates a current used to recharge battery system 144.

Engine 104 produces a desired torque based on a driver input via a driver input device 156, e.g., an accelerator pedal. Driver input can represent a torque request for the engine system 100. Controller 160 controls operation of engine system 100 and, more particularly, controls components of the engine system 100 to fulfill the torque request. Controller 160 controls airflow by controlling the throttle 116 and controls ignition timing by controlling the ignition controller 124. Controller 160 also controls MGU 136 by selectively powering the electric motor 148 according to a specified duty cycle and using a current from the battery system 144, which is described in greater detail below.

Figure 2:
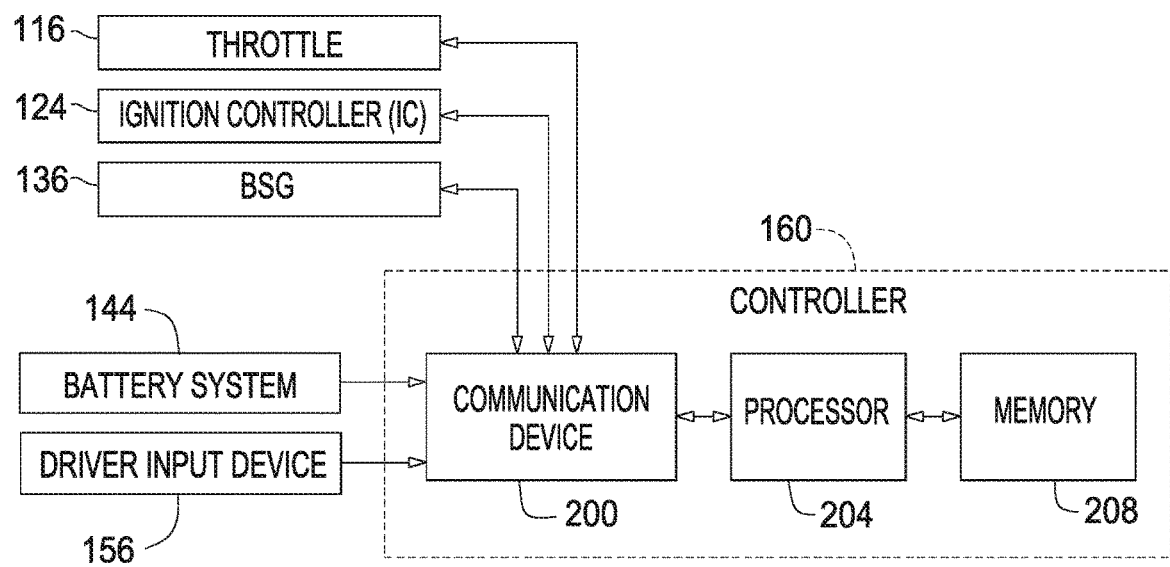
FIG. 2 is a control schematic.

Referring now to FIG. 2, an example functional block diagram of the controller 160 is illustrated. Controller 160 includes communication device 200, processor 204, and a memory 208. Memory 208 can comprise any suitable storage medium configured to store code and information for controller 160. For example, memory 208 may store the predetermined threshold(s) for the battery system 144 and/or the MGU torque coefficient, which are described in greater detail below.

Controller 160 detects a speed signal of the internal combustion engine 124, a driver input signal 156, a battery state signal 144, a motor-generator state signal 136 and a throttle position signal 116.

Communication device 200 can include any suitable component, e.g., a transceiver, configured for communication with components of the engine system 100 via a controller area network (CAN) (throttle 116, ignition controller 124, MGU 136, battery system 144, driver input device 156, etc.). It should be appreciated that the communication device 200 can also be configured to communicate with other components (remote server, mobile phone, another vehicle, etc.) via another network, such as a local area network (LAN), e.g., Bluetooth communication, or a wide area network (WAN), e.g., the Internet.

Processor 204 is configured to control operation of controller 160. Functions can include, but are not limited to, loading/executing an operating system of controller 160, controlling information sent via communication device 200, processing information received via communication device 200, and controlling read/write operations at memory 208. Processor 204 can also wholly or partially execute the torque management techniques.

Processor 204 determines a desired torque output from engine system 100 ($T_{desired}$) in response to a torque request. The torque request can be based on drive input via the driver input device 156. The desired torque output from engine system 100 represents a desired torque at crankshaft 128 of engine 104. The torque at crankshaft 128 can be provided from the engine 104 or a combination of engine 104 or with MGU 136 operating as a torque generator.

Processor 204 can determine a current engine torque capacity ($ET_{current}$). The current engine torque capacity represents a torque capacity of engine 104 at current operating parameters (driver input, throttle position, ignition timing, etc.).

Processor 204 then determines whether the desired torque output of engine system 100 is greater than the current engine torque capacity. When the desired torque output of engine system 100 is less than or equal to the current engine torque capacity, processor 204 controls engine 104 via communication device 200 to generate the desired torque output at flywheel 132. When the desired torque output is greater than current engine torque capacity, processor 204 determines a maximum engine torque capacity. The maximum engine torque capacity represents a maximum torque capacity of engine 104 under any operating condition. Processor 204 determines a current MGU torque capacity. The current MGU torque capacity comprises the torque capacity of MGU 136 under current operating conditions.

Processor 204 commands MGU 136 via communication device 200 to operate as a torque generator or a torque consumer based on a difference between (i) the desired torque output of engine system 100 and the maximum engine torque capacity and (ii) the charge state of battery system 144. Processor 204 commands MGU 136 to operate as a torque consumer (torque load) when the charge state of battery system 144 indicates that MGU 136 would be incapable of operating as a torque generator to generate torque at the crankshaft 128. Similarly, processor 204 can command MGU 136 to operate as a torque generator when the state of the battery system 144 indicates that MGU 136 would be capable of operating as a torque generator to generate torque at the crankshaft 128 for a reasonable period of time. There can also be states of the battery system 144 where MGU 136 could operate as either a torque generator or a torque consumer.

After determining whether to operate MGU 136 as a torque generator or a torque consumer, processor 204 controls engine 104 and MGU 136 via communication device 200 to collectively generate the desired torque output at flywheel 132 of engine 104. In some cases, MGU 136 may be capable of generating enough torque at flywheel 132 such that engine 104 can continue operating at the current operating parameters (throttle position, ignition timing, etc.). In other cases, processor 204 may adjust the operating parameters of engine 104 to increase its torque output at flywheel 132, up to the maximum engine torque capacity, if necessary. More specifically, processor 204 can control engine 104 via communication device 200 to generate a sum of (i) the desired torque output and (ii) a portion of the current MGU torque capacity at flywheel 132 when MGU 136 is commanded to operate as the torque consumer. Alternatively, processor 204 can control engine 104 via communication device 200 to generate a difference between (i) the desired torque output and (ii) the portion of the current MGU torque capacity when MGU 136 is commanded to operate as a torque generator.

FIG. 3 is a coupled tensioner. Coupled tensioner 400 is commonly implemented for an MGU drive. Coupled tensioner is typically fixed to the MGU 136 and engages the belt 140, see FIG. 4f. The coupled, also referred to as an orbital, tensioner typically comprises a dual arm, single spring function. The base arm 401a rotates about a base 403. The side arm 402a pivots upon base arm 401. Base arm 401a and side arm 402a are biased to apply a belt load with a torsion spring (not shown). Each pulley 401, 402 engages a span of belt 140 to maintain a proper tension in belt 140. Shaft 153 of MGU 136 projects through a central portion of tensioner 400. Belt 140 engages a pulley (not shown) mounted to shaft 153.

The first natural frequency of a belt drive is significantly lower than that of a lock-center drive or with a single tensioner. As shown in FIG. 4a with a coupled (CPL) tensioner the $1^{st}$ system frequency is reduced to 11 Hz. The $1^{st}$ system frequency is usually well below engine firing frequency at its idle speed. For example, a 3-cyl engine's firing frequency at 800 rpm is 20 Hz. For a 4-cyl engine firing at 800 rpm the frequency is 26.7 Hz. Therefore, the primary system resonance does not happen within the normal engine speed range.

However, during engine start, either in key-start or low rpm MGU start, the engine starts to fire at a lower speed than the resonance rpm. As a result there will be system resonance when the engine speed passes through the resonance rpm, generating excessive system vibration.

FIG. 4b is a chart showing the $1^{st}$ system frequency for different types of tensioners. "Fixed" refers to a fixed idlers A,B as shown in FIG. 4c. In FIG. 4c, a crankshaft pulley 500 is engaged with an accessory pulley 600 and the MGU rotor pulley 175 by a belt 140. "One TEN" refers to a single arm tensioner as shown in FIG. 4d. "Dual TEN" refers to two independent tensioners as shown in FIG. 4e.

Figure 4F:
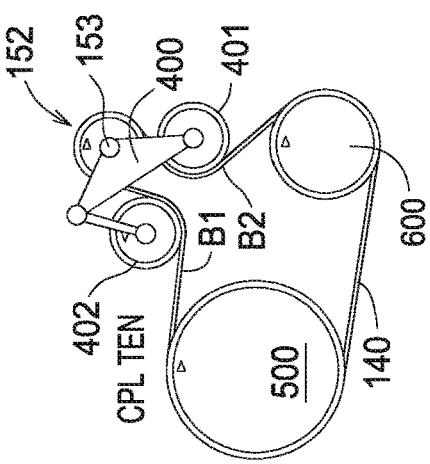
FIG. 4f is a system schematic.
Figure 4E:
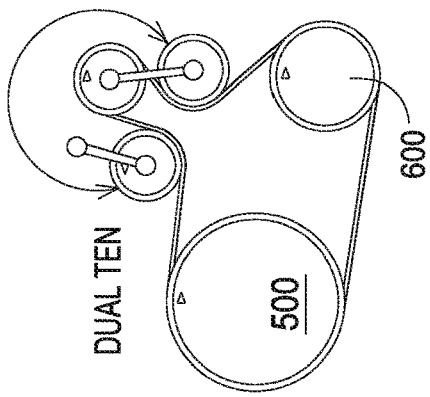
FIG. 4e is a system schematic.
Figure 4D:
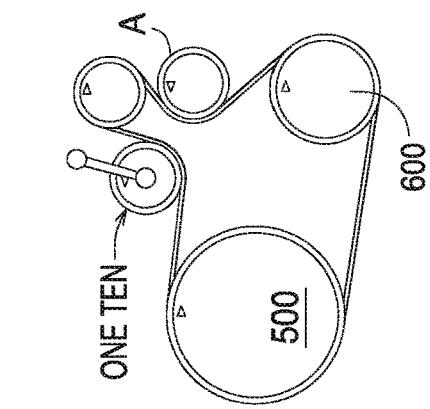
FIG. 4d is a system schematic.
Figure 4C:
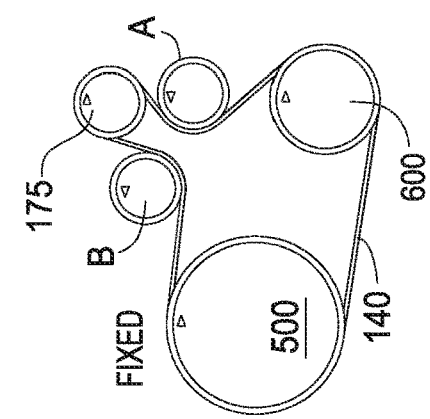
FIG. 4c is a system schematic.

"CPL TEN" refers to a coupled tensioner 400 as shown schematically in FIG. 4f. Coupled tensioner 400 is described in FIG. 3. Each arm of tensioner 400 engages a belt span B1 and B2. Tensioner 400 is mounted to MGU 136.

Figure 5A:
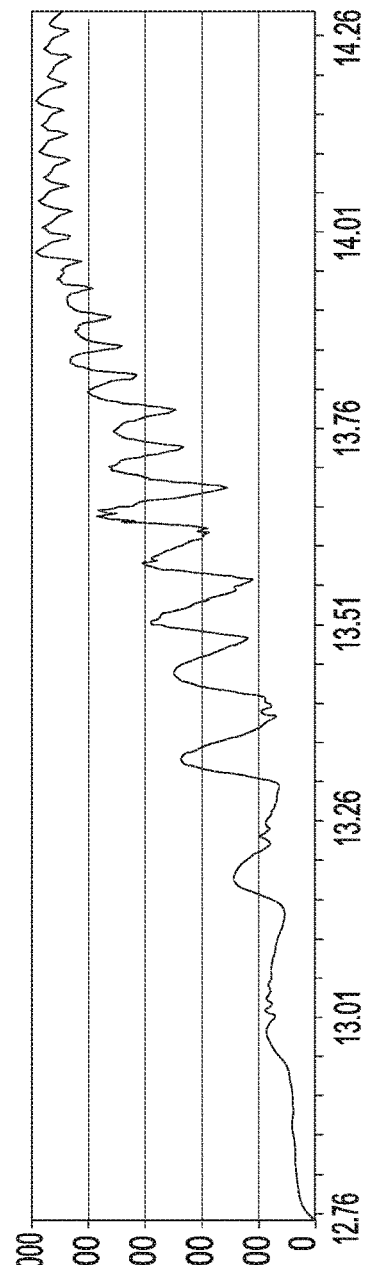
FIG. 5a is a chart showing crankshaft rotational speed during engine start.

Shown in FIG. 5 is the engine rpm and tensioner arm vibration measured during key-start of a 4-cyl diesel engine which is equipped with a dual-mass flywheel. FIG. 5a shows crankshaft rotational speed. FIG. 5b shows tensioner base arm 401 angle versus time. FIG. 5c shows tensioner side arm 402 angle versus time.

The MGU drive with a coupled tensioner resonates around 400 rpm. The base-arm of the coupled tensioner has a 55° peak-peak vibration and the side-arm has a 40° p-p vibration; both exceed the design limit for durability. The peak belt tension and hubload are also higher than allowable limits.

The excessive system vibration is attributed to 1) a high engine speed fluctuation or angular vibration and 2) the higher effective moment of inertia of the MGU, and 3) engine speed around the system resonance frequency. In the case of an engine start, vibration is of the first system resonance.

Since MGU rotor motion and its inertia torque is the main factor for excessive system dynamics, the pupose is to use MGU torque to rotate the MGU rotor in accordance with engine speed. Namely, when the engine accelerates, a motoring torque is applied to speed up the MGU rotor. When the engine decelerates, a load torque is applied to slow down the MGU rotor. These MGU actions for vibration attenuation not only apply to engine starts but also to other engine operations when the MGU drive has vibration problems.

Figure 6:
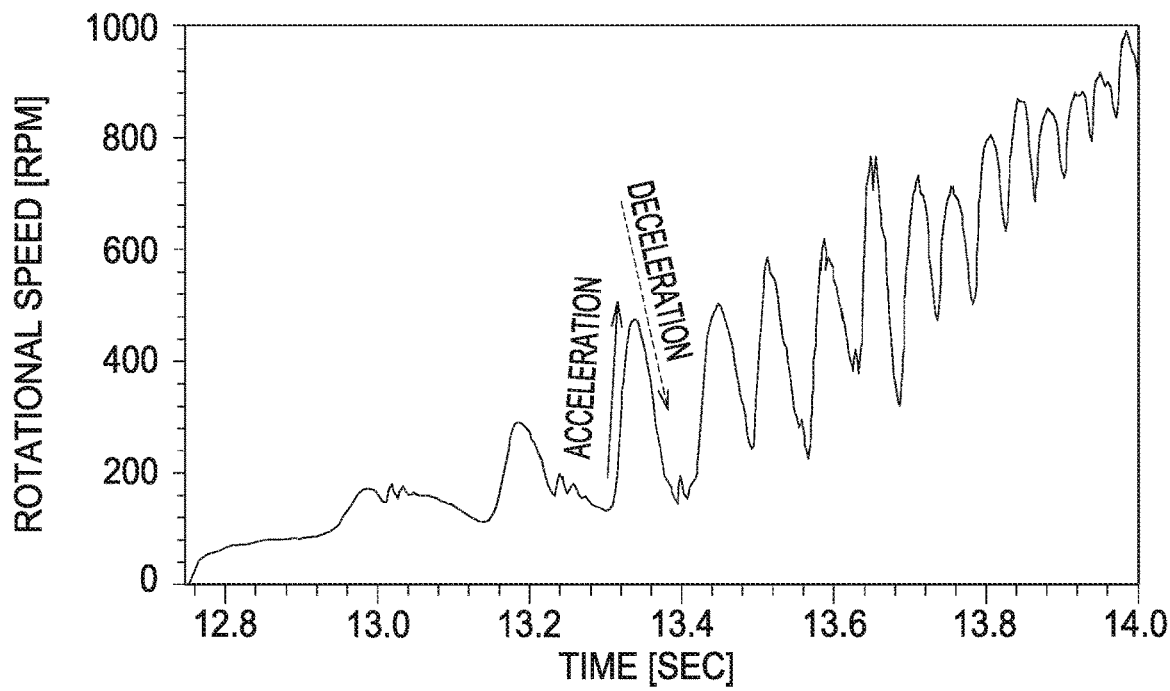
FIG. 6 is a chart showing MGU engine speed and fluctuation during engine start.

Referring to FIG. 6 which shows MGU rotor speed versus time, to achieve vibration damping (attenuation) via MGU torque control, the engine speed is measured and the desired MGU accel/decel calculated. The MGU torque is applied according to the calculated inertia torque due to MGU accel/decel, which is taken as (CRK accel/decel×Speed Ratio×Inertia of MGU Rotor). For example, for a CRK accel=20,000 rpm/s or 2094 rad/s^2, a speed ratio of 2.6, and MGU rotor inertia of 0.0045 kg-m^2, the inertia torque of the MGU rotor is 24.5 Nm.

MGU torque is controlled as follows:
1) No action when the MGU inertial torque is less than the required threshold torque (TQ); +TQ in accel (usually clockwise as engine rotation direction) and −TQ in decel (counter-clockwise).
2) Applied as a constant or varying torque by the MGU when the inertia torque reaches or exceeds the threshold TQ. It is applied as motoring or driving torque in accel and load torque in decel.

Figure 7:
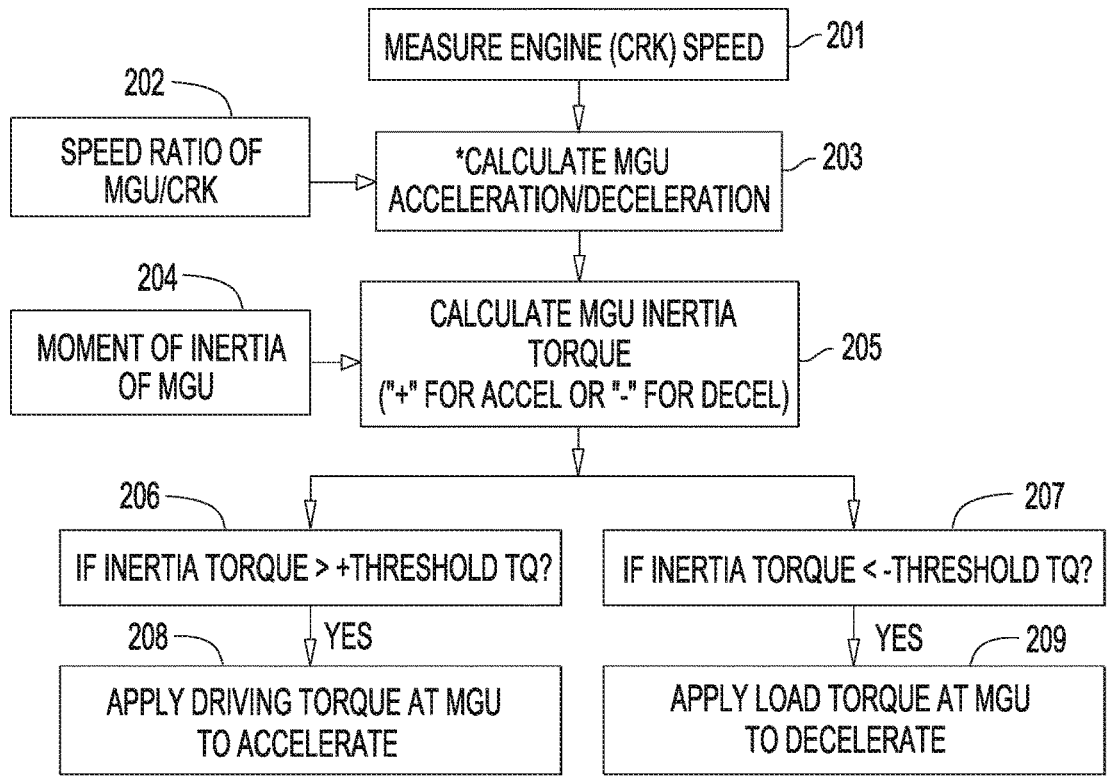
FIG. 7 is a MGU control flow chart.

Shown in FIG. 7 is the MGU torque control flow chart. First, engine speed and MGU speed are measured 201. The speed ratio of the MGU speed and the engine speed is calculated 202 by the controller. The appropriate MGU accel/decel is then calcuated 203 by the controller. The MGU intertia torque is then calcuated 205 by the controller. If the inertia torque is greater than the threshold torque 206 then a driving torque is applied by MGU upon command of the controller 208. If the inertia torque is less than the threshold torque 207 then a load torque is applied by MGU upon command of the controller 209.

Figure 8:
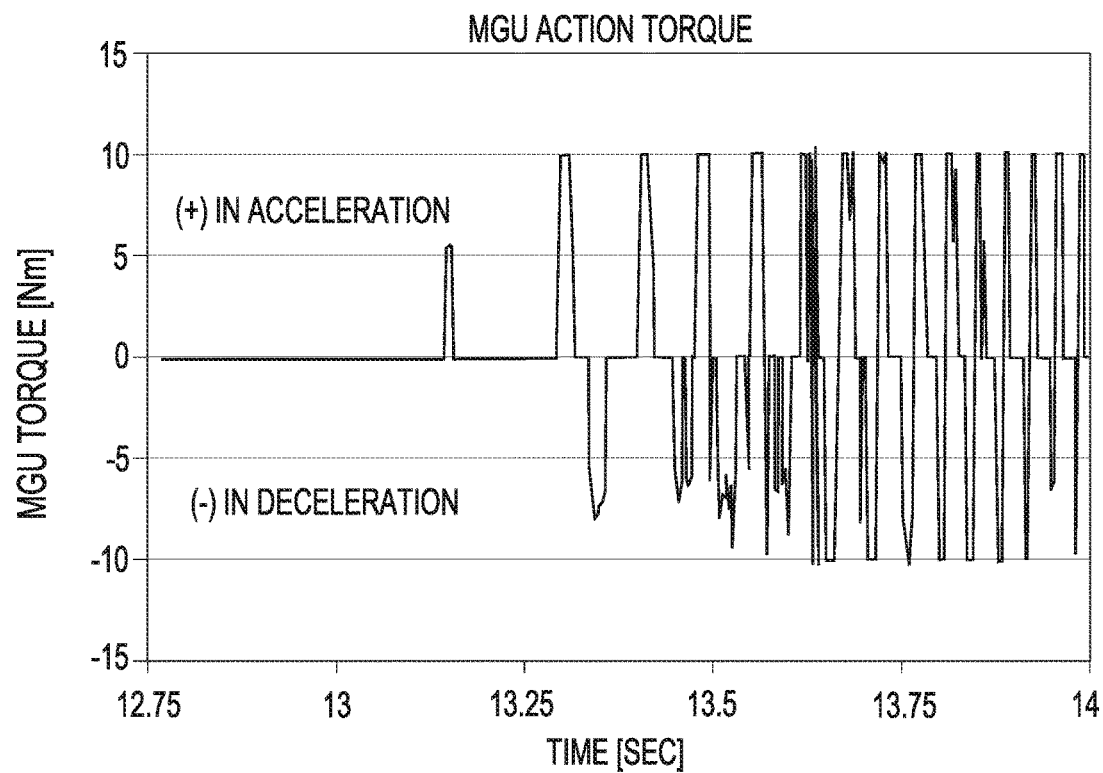
FIG. 8 is a chart showing MGU torque versus time.

Shown in FIG. 8 is one example of MGU action torque during engine start. The chart shows MGU torque in Nm as a function of time.

Figure 9:
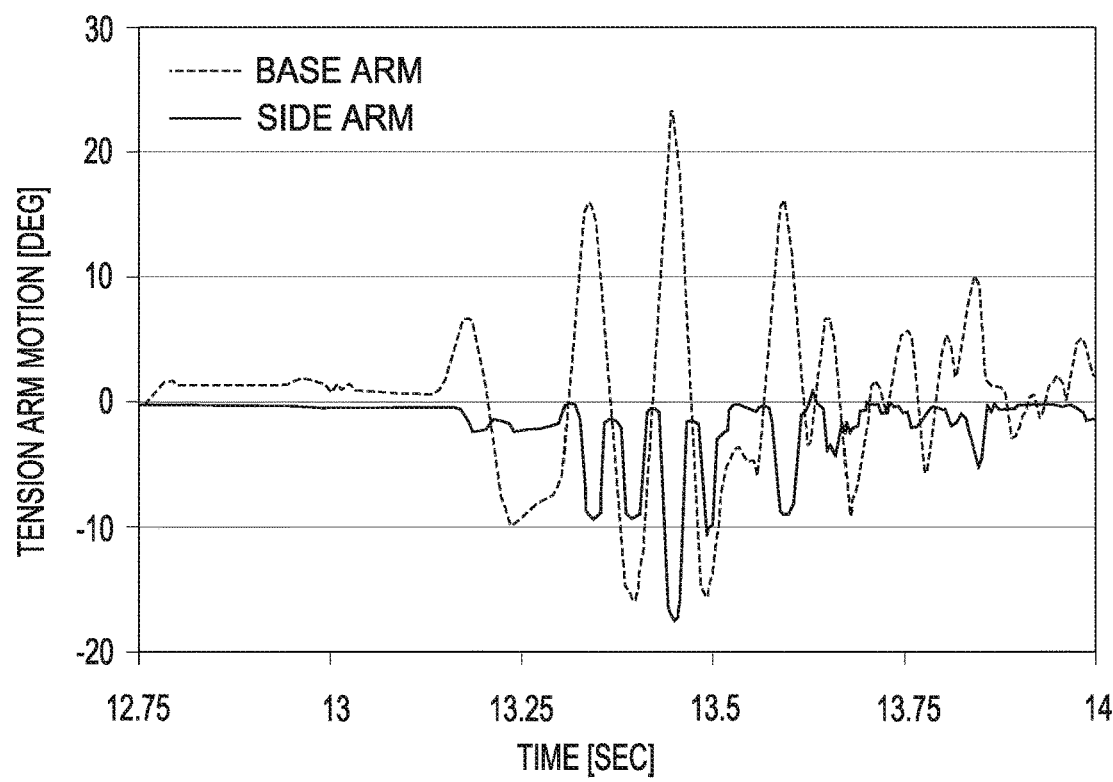
FIG. 9 is a chart showing tensioner arm motion.

Shown in FIG. 9 is an example of tensioner arm vibration as reduced by MGU torque action. In particular there is a 29% vibration reduction of the base arm 401 and a 54% reduction of the side-arm 402. The MGU torque action adjustments are applied by the controller to the system at a frequency greater than approximately 1 Hz. For example, in FIG. 9 the frequency is approximately 18 Hz, which is greater than 10 Hz. The MGU torque action frequency is less than approximately 50 Hz since the vibration attenuation is most required at start-up of the engine when the RPM is low.

A motor-generator system comprising an internal combustion engine, a motor-generator in driven engagement with the internal combustion engine by an endless belt, the motor-generator, a controller detecting a speed signal of the internal combustion engine, a driver input signal, a battery state signal and a motor-generator signal, the motor-generator operable to provide a motoring torque or a load torque to the internal combustion engine at a predetermined frequency according to a controller command, and the controller controlling the motor-generator torque at a frequency greater than 1 Hz such that when the internal combustion engine accelerates the motoring torque is applied to speed the motor-generator rotation and when the internal combustion engine decelerates the load torque is applied to slow motor-generator rotation such that motor-generator rotation is controlled to attenuate a system vibration.

Although a form of the invention have been described herein, it will be obvious to those skilled in the art that variations may be made in the construction and relation of parts without departing from the spirit and scope of the inventions described herein.

I claim:

1. A method of controlling a motor-generator torque comprising:
   measuring an engine speed;
   detecting a motor-generator acceleration or deceleration;
   calculating a motor-generator inertia torque using the acceleration or deceleration;
   determining a threshold torque;
   determining if the motor-generator inertia torque is greater than or less than the threshold torque;
   applying a driving torque to the motor-generator to damp a system vibration if the motor-generator inertia torque is greater than the threshold torque;
   applying a load torque to the motor-generator to damp a system vibration if the motor-generator inertia torque is less than the threshold torque; and
   applying the driving torque and load torque at a frequency in the range of approximately 1 Hz to approximately 50 Hz.

2. The method as in claim 1, wherein applying the driving torque and the load torque occurs at a frequency less than approximately 30 Hz.

3. The method as in claim 1, comprising applying the driving torque and the load torque for an engine speed less than approximately 1000 RPM.

4. A method of controlling a motor-generator system comprising:
   measuring an engine speed;
   engaging a motor-generator with the engine with a belt;
   calculating a motor-generator inertia torque;
   determining a motor-generator threshold torque according to the engine speed;
   determining if the motor-generator inertia torque is greater than or less than the motor-generator threshold torque;
   controlling the motor-generator inertia torque to damp a system vibration by applying a load torque or a driving torque at a frequency greater than approximately 1 Hz and for an engine speed less than approximately 1000 RPM.

5. The method as in claim 4, comprising controlling the motor-generator inertia torque for an engine speed greater than approximately 100 RPM.

6. The method as in claim 4, comprising controlling the motor-generator inertia torque to attenuate a system vibration by applying a load torque or a driving torque at a frequency less than approximately 50 Hz.

* * * * *